US007843513B2

(12) United States Patent
Descure et al.

(10) Patent No.: US 7,843,513 B2
(45) Date of Patent: Nov. 30, 2010

(54) AUTOMATIC ADAPTATION OF A VIDEO SOURCE TO A RECEIVER

(75) Inventors: Pierrick Descure, Saint Ismier (FR); Jean-Marc Merval, Veurey-Voroize (FR)

(73) Assignee: STMicroelectronics S.A., Montrouge (FR)

( * ) Notice: Subject to any disclaimer, the term of this patent is extended or adjusted under 35 U.S.C. 154(b) by 1166 days.

(21) Appl. No.: 11/490,570

(22) Filed: Jul. 21, 2006

(65) Prior Publication Data

US 2007/0022466 A1 Jan. 25, 2007

(30) Foreign Application Priority Data

Jul. 22, 2005 (FR) .................................... 05 52275

(51) Int. Cl.
*H04N 5/268* (2006.01)
*H04N 5/14* (2006.01)
*H03F 1/14* (2006.01)
*H03F 3/68* (2006.01)

(52) U.S. Cl. ...................... 348/707; 348/725; 348/706; 330/51; 330/85

(58) Field of Classification Search .................. 348/706, 348/707, 725; 330/51, 85
See application file for complete search history.

(56) References Cited

U.S. PATENT DOCUMENTS

| | | | |
|---|---|---|---|
| 5,606,716 A | | 2/1997 | Miyadera et al. |
| 5,721,594 A | * | 2/1998 | Gurley et al. ............... 348/707 |
| 5,896,183 A | * | 4/1999 | Terk et al. ................... 348/706 |
| 6,281,943 B1 | * | 8/2001 | Kim ............................ 348/656 |
| 6,292,232 B1 | * | 9/2001 | Oyagi ......................... 348/725 |
| 6,483,554 B1 | * | 11/2002 | Kim ............................ 348/731 |
| 6,542,725 B2 | * | 4/2003 | Armbruster et al. ......... 455/307 |
| 6,586,661 B1 | * | 7/2003 | Conkling et al. ......... 800/317.3 |
| 6,757,025 B1 | * | 6/2004 | Takano et al. ............... 348/554 |
| 6,833,877 B2 | * | 12/2004 | Wang .......................... 348/705 |
| 6,952,240 B2 | * | 10/2005 | Gower et al. ................ 348/678 |
| 7,519,130 B2 | * | 4/2009 | Hsu et al. .................... 375/292 |
| 7,620,376 B2 | * | 11/2009 | Vaisanen .................... 455/107 |
| 7,683,974 B2 | * | 3/2010 | Sun et al. .................... 348/705 |
| 2002/0000845 A1 | | 1/2002 | Lu et al. |

OTHER PUBLICATIONS

French Search Report from French Patent Application 05/52275, filed Jul. 22, 2005.

\* cited by examiner

*Primary Examiner*—Brian Yenke
(74) *Attorney, Agent, or Firm*—Lisa K. Jorgenson; William R. McClellan; Wolf, Greenfield & Sacks, P.C.

(57) ABSTRACT

An electronic system providing a video signal to an output terminal intended to be connected to a receiver having one input impedance out of two input impedances, the electronic system including an adaptable amplifier providing the video signal and capable of operating according to one operation configuration out of two operation configurations, each operation configuration being adapted to one of the two input impedances of the receiver; circuitry for detecting characteristic portions of the video signal; and control and measurement circuitry capable of measuring a signal representative of the current provided to the output terminal by the electronic system during each detected characteristic portion, and of having the adaptable amplifier adopt one of the two operation configurations based on the comparison of the representative measured signal with thresholds.

24 Claims, 3 Drawing Sheets

US 7,843,513 B2

AUTOMATIC ADAPTATION OF A VIDEO SOURCE TO A RECEIVER

BACKGROUND OF THE INVENTION

1. Field of the Invention

The present invention relates to the adaptation of an electronic system, called a source, transmitting an analog video signal, generally a variable voltage, to another electronic circuit, called a receiver, via transmit means.

The present invention relates to the transmission of a video signal from a source which for example corresponds to a reader of a DVD-type video disk (Digital Versatile Disk), to a camera or to a decoder box (Set Top Box) and a receiver, which for example corresponds to a display screen or to a video recording system. The transmit means connecting the source to the receiver may correspond to a cable. For the video signal received by the receiver to be as little deformed as possible, it is necessary for the source impedance and the receiver impedance to be equal to the characteristic impedance of the transmit means. It can then be said that the connection is adapted. The characteristic impedance of a cable most used for the transmission of a video signal is 75 ohms 2. Discussion of the Related Art Different international standards, for example, standard EIA, define the features of the video signals used for such transmissions. Currently, to perform a transmission with the best possible quality while respecting the existing standards, the video signal comprises a non-zero D.C. component which is transmitted to the receiver. Such a connection is designated as DC and a receiver capable of receiving a video signal with a non-zero D.C. component is called a DC receiver.

FIG. 1 schematically shows a source 10 of a video signal $S_{OUT}$ connected to a DC receiver 12 by a cable 14. Source 10 comprises an output stage 16 comprising a generator 18 receiving a video signal $S_{VIDEO}$ and providing a video signal $S_{OUT}$. Generator 18 is connected to a source of a reference voltage 19, generally the ground of source 10. A resistor 20 is provided between the output of generator 18 and an output terminal O of source 10. Cable 14 is connected between terminal O and an input terminal I of receiver 12. DC receiver 12 comprises a resistor 22 connected between terminal I and a source of a reference voltage 24, generally the ground of receiver 12. To obtain an adapted connection, resistors 20 and 22 have the same value as the characteristic impedance of cable 14.

There exist certain standards, for example, Japanese standards, which require that the video signal transmitted over the cable to comprise no D.C. component and which, for this purpose, provide for the receiver to comprise a capacitive element in series with a resistive element to eliminate the D.C. component of the video signal provided by the source. Such a connection is known as an AC connection and a receiver capable of receiving a video signal with a zero D.C. component is called an AC receiver.

FIG. 2 shows a diagram similar to FIG. 1 in the case of an A.C. connection. AC receiver 12 comprises a capacitor 26 series-assembled between terminal I and resistor 22.

The receiver to which the video signal source can be connected has an input impedance which may thus be purely resistive or comprise a resistive component and a capacitive component. In the case of a DC receiver, the source must be able to supply current while in the case of an AC receiver, the source must be able to both supply and absorb current.

FIG. 3 shows a conventional example of embodiment of a video signal source capable of being connected to a DC receiver or to an AC receiver. Output stage 16 comprises a circuit of emitter follower type comprising a differential amplifier 25 having its positive terminal (+) receiving video signal $S_{VIDEO}$ and having its negative terminal (−) connected to a node E. A resistor $R_{g1}$ is provided between node E and a source of a reference voltage $V_{REF}$. A resistor $R_{g2}$ is provided between node E and a node F. The output of amplifier 25 drives the base of an NPN-type bipolar transistor $T_{buf}$ having its collector connected via a resistor $R_{buf}$ to a source of a reference voltage 27, for example, the positive supply of source 10, and having its emitter connected to node F. Resistor 20 is arranged between nodes F and O. A current generator 28 is arranged between node F and ground 19. Source 10 is likely to absorb and supply current and can thus be connected to an AC receiver or to a DC receiver. However, such a source 10 has the disadvantage of a strong consumption since current generator 28 supplies current uselessly when it is connected to a DC receiver.

SUMMARY OF THE INVENTION

The present invention provides a video signal source which is capable of being connected, according to an adapted connection, to a receiver having an input impedance which is purely resistive or comprises a resistive component and a capacitive component and which has a reduced power consumption whatever the nature of the receiver to which it is connected.

Another object of the present invention is to provide a video signal source of simple design.

The present invention provides an electronic system providing a video signal to an output terminal intended to be connected to a receiver having one input impedance out of two input impedances. The electronic system comprises an adaptable amplifier providing the video signal and capable of operating according to one operation configuration out of two operation configurations, each operation configuration being adapted to one of the two input impedances of the receiver; means for detecting characteristic portions of the video signal; and control and measurement means capable of measuring a signal representative of the current provided to the output terminal by the electronic system during each detected characteristic portion, and of having the adaptable amplifier adopt one of the two operation configurations based on the comparison of the representative measured signal with thresholds.

According to an embodiment of the present invention, the adaptable amplifier provides the video signal in the form of a succession of cycles, each cycle starting with a pulse, said characteristic portions corresponding to said pulses.

According to an embodiment of the present invention, the adaptable amplifier comprises a current generator connected to the output terminal, said control means being capable of deactivating the current generator when the sum of the current provided by the current generator and of the current provided to the output terminal is greater than a first current during one of the characteristic portions, and of activating the current generator when the current provided to the output terminal is smaller than a second current during one of the characteristic portions, the second current being smaller than the first current.

According to an embodiment of the present invention, the system provides a given number of output signals to said given number of output terminals, each connected to a receiver having one input impedance out of two input impedances, the electronic system comprising said given number of adaptable amplifiers, each providing one of said given number of video signals, each amplifier being capable of operating according to one operation configuration out of two operation configurations, each operation configuration being adapted to one of the two input impedances of the receiver; means for detecting characteristic portions of a video signal out of said number of video signals; and said number of control means, each control means being capable of measuring a signal representative of the current provided by one of the amplifiers adaptable to the associated output terminal during each detected characteristic portion and of having said adaptable amplifier adopt one of the two operation configurations based on the comparison of the representative measured signal with thresholds.

According to an embodiment of the present invention, the adaptable amplifier comprises a differential amplifier having a first input receiving an input video signal and having a second input connected to a node, said node being connected to a source of a reference voltage via a first resistor and to the output terminal via a second resistor, the output of the differential amplifier being connected to the control terminal of a first transistor having a first main terminal connected to the output terminal and having a second main terminal connected to a source of a first reference voltage via a third resistor, the current generator comprising a second transistor having a first main terminal connected to the output terminal and having a second main terminal connected to a source of a second reference voltage.

According to an embodiment of the present invention, the current generator comprises a switch arranged between the control terminal of the second transistor and the source of the second reference voltage.

According to an embodiment of the present invention, the control means comprises third and fourth transistors having their control terminals connected in common to a first main terminal of the third transistor, a second main terminal of the third transistor being connected to the source of the first reference voltage via a fourth resistor, the first main terminal of the third transistor being connected to the source of the second reference voltage via a fifth resistor, a first main terminal of the fourth transistor being connected to the second main terminal of the first transistor via a sixth resistor, a second main terminal of the fourth transistor being connected to the source of the second reference voltage via a seventh resistor, the representative signal being the voltage across the seventh resistor.

According to an embodiment of the present invention, the control means comprise a hysteresis comparator receiving the representative measured signal and being capable of turning on the switch when the representative signal is greater than a first voltage and of turning off the switch when the representative signal is smaller than a second voltage smaller than the first voltage.

According to an embodiment of the present invention, the control means comprise means for storing the representative signal connected to the hysteresis comparator; and a switch controlled by the detection unit and arranged between the storage means and the first main terminal of the fourth transistor.

The present invention also provides a method for adapting an electronic system providing a video signal to an output terminal intended to be connected to a receiver having one input impedance out of two input impedances. The method comprises the steps of providing an adaptable amplifier providing the video signal and capable of operating according to one operation configuration out of two operation configurations, each operation configuration being adapted to one of the two input impedances of the receiver; detecting characteristic portions of the video signal; measuring a signal representative of the current provided by the electronic system to the output terminal during each detected characteristic portion; and having the adaptable amplifier adopt one of the two operation configurations based on the comparison of the representative measured signal with thresholds.

The foregoing objects, features, and advantages of the present invention, as well as others, will be discussed in detail in the following non-limiting description of specific embodiments in connection with the accompanying drawings.

DETAILED DESCRIPTION

Figure 1:
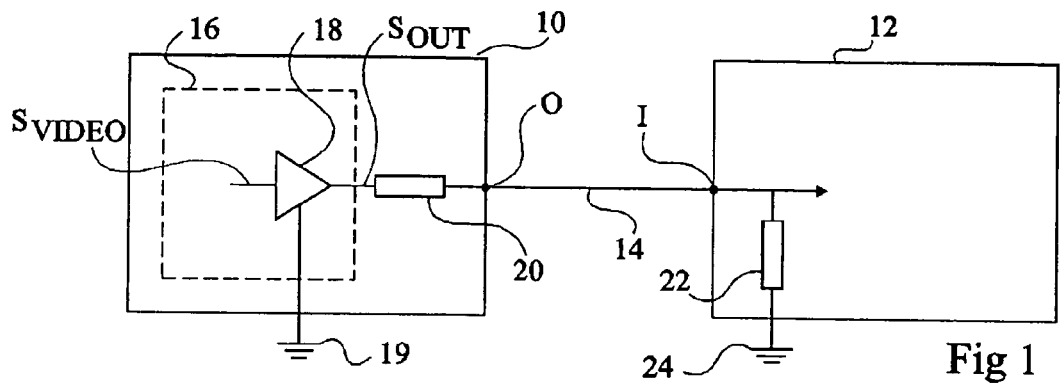
FIGS. 1 and 2, previously described, schematically show a conventional video signal source respectively connected to a DC receiver and to an AC receiver.
Figure 2:
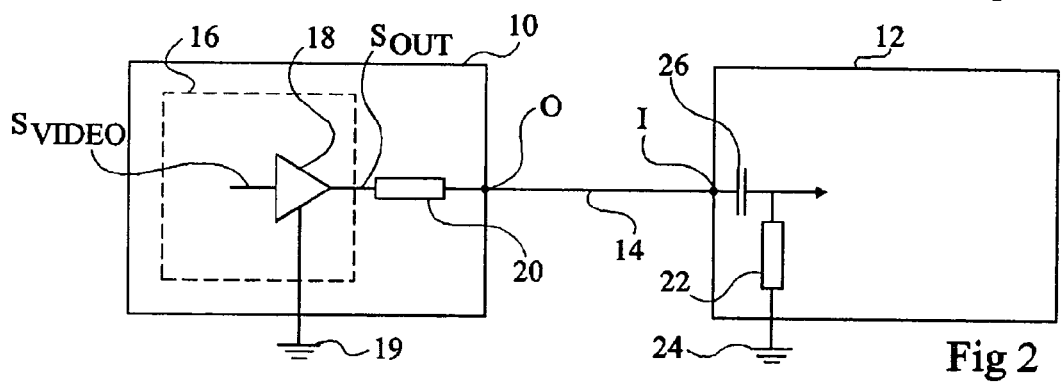

In the drawings, the same reference numerals designate identical elements or similar elements exerting identical functions. Further, in the following description, the base of a bipolar transistor and the gate of a MOS transistor are designated as the control terminal of a transistor, and the emitter or the collector of a bipolar transistor and the drain and the source of a MOS transistor are designated as the main terminal of a transistor.

The present invention provides having the video signal source automatically detect the nature of the receiver to which it is connected so that the source adapts to the receiver to maintain a small power consumption.

A possibility to distinguish the nature of the receiver is to measure the average current provided by the source when it is connected to the receiver. Indeed, the average current is substantially zero for an AC receiver and is generally not zero for a DC receiver (the average value of video signal $S_{OUT}$ being generally different from 0). However, video signal $S_{OUT}$ is a very irregular signal and the determination of an average value of the current representative of the nature of the receiver would require acquiring samples over a significant time period. Such a method for detecting the nature of the receiver would then be little reactive and would have a significant power consumption cost.

The present invention provides performing an automatic detection of the nature of the receiver by measurement of a signal representative of the current provided by the source to the receiver at specific times for which the video signal provided by the source is constant and keeps the same value at the different measurement times. The current measured at such times thus has a substantially constant value which will depend on the nature of the receiver. According to the measured current, the source adopts one operation characteristic out of two possible operation characteristics, one being adapted to a DC receiver and the other to an AC receiver. As an example, the source comprises a current generator which is deactivated when a DC receiver is detected and which is activated when an AC receiver is detected.

Figure 4:
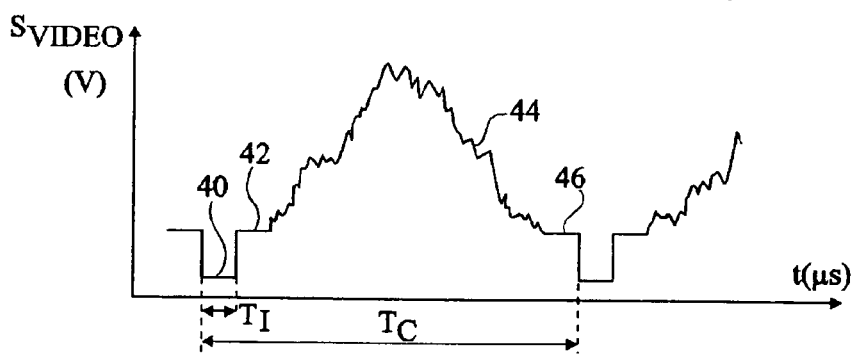
FIG. 4 shows an example of a composite video signal.

FIG. 4 shows a conventional example of video signal $S_{VIDEO}$ received by the output stage of a video signal source. Such a signal is called a composite video signal or CVBS signal (for Chroma Video Blanking Synchro). Signal $S_{VIDEO}$ is a cyclic signal for which duration $T_C$ of a cycle, for example, of 64 µs, corresponds to the duration of the scanning of a line of a screen and of the fly-back to the next line. A cycle starts with a pulse 40 of duration $T_P$, for example, of 4.7 µs. When receiver 12 is a display screen, pulses 40 are used to provide synchronization signals to control the screen scanning. For this reason, pulses 40 are generally called synchronization pulses. For each cycle, pulse 40 is successively followed by a stage of constant level 42, representative of the "black" level of the image, with a portion of variable level 44, which corresponds to the actual information content of a line in the image, that is, to the luminance and to the chrominance. Variable portion 44 is followed by a stage 46 of the black level which closes the cycle. A current measurement is performed for each cycle during start-of-cycle pulse 40 or during stages 42, 46. In practice, pulses 40 being easy to detect, an example of embodiment of the present invention provides detecting a signal representative of the current provided by the source during the pulses of composite video signal $S_{VIDEO}$.

Figure 5:
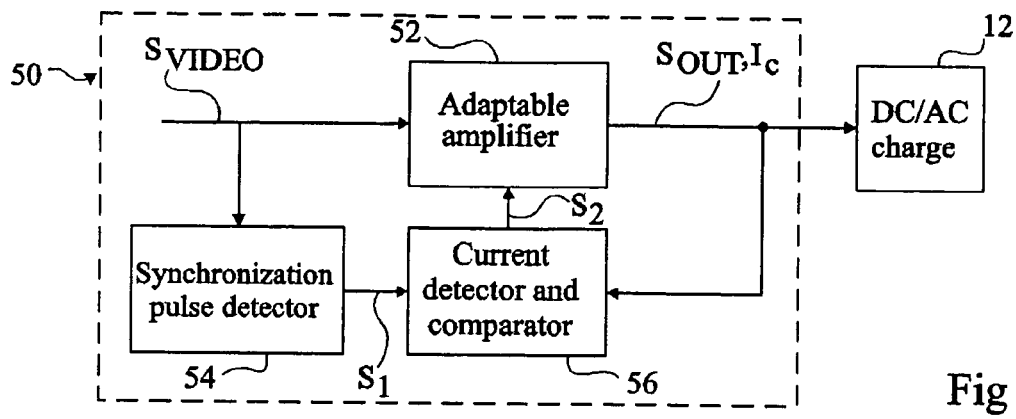
FIG. 5 schematically illustrates the operating principle of an example of embodiment of a video signal source according to the present invention.

FIG. 5 illustrates the operation principle of an example of embodiment of a video signal source 50 according to the present invention. The output stage comprises an adaptable amplifier 52 which receives video signal $S_{VIDEO}$ and which provides a video signal $S_{OUT}$ and a current $I_c$ to receiver 12. The output stage comprises a unit 54 for detecting the synchronization pulses contained in video signal $S_{VIDEO}$ which provides, on each detection of a pulse 40, a control signal $S_1$ to a current measurement and comparison unit 56. For each detected pulse, unit 56 determines a signal representative of current $I_c$ provided by source 50 and compares the determined value with thresholds. According to the result of the comparison, unit 56 provides a control signal $S_2$ to amplifier 52 which adopts an operation characteristic adapted to a DC receiver or to an AC receiver.

Figure 3:
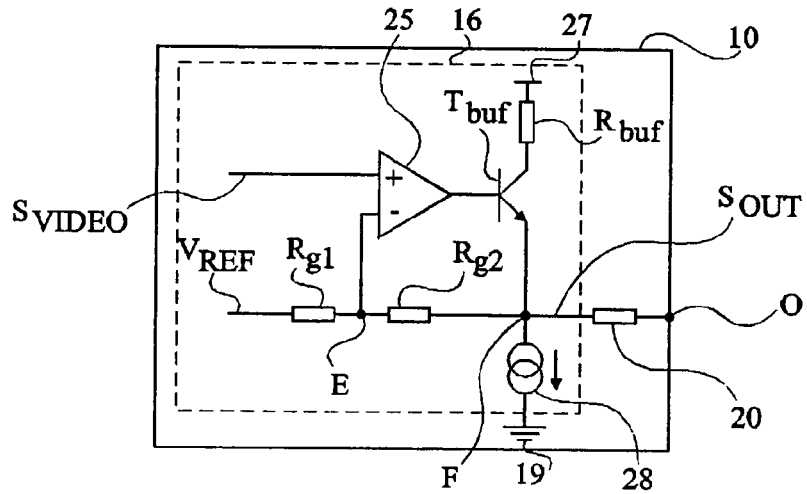
FIG. 3, previously described, shows a conventional example of a source likely to be indifferently connected to a DC receiver or to an AC receiver.
Figure 6:
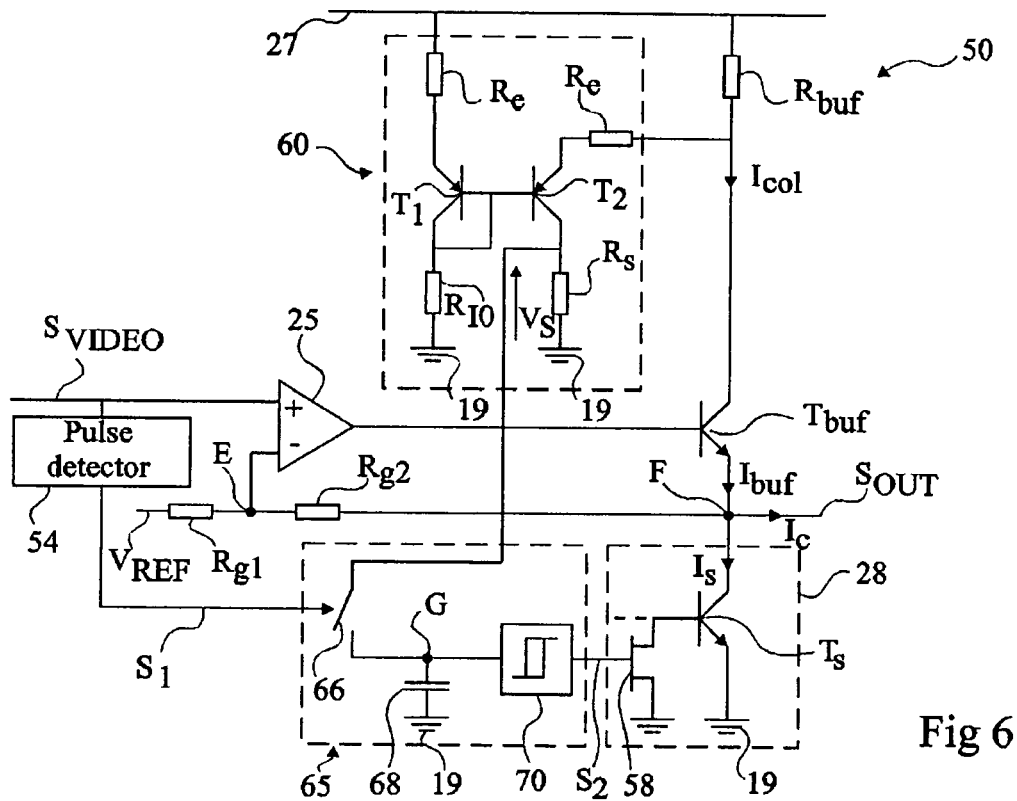
FIG. 6 shows a more detailed embodiment of the source of FIG. 5.

FIG. 6 shows a more detailed example of embodiment of the output stage of source 50 of FIG. 5. The elements common with output stage 16 shown in FIG. 3 are designated with the same references. In particular, it shows differential amplifier 25, power transistor $T_{buf}$ assembled as an emitter follower and resistors $R_{g1}$ and $R_{g2}$. In the present example of embodiment, current generator 28 is formed of an NPN-type bipolar transistor $T_s$ having its collector connected to node F and having its emitter connected to ground 19. The base of transistor $T_s$ is connected to a circuit for providing a bias signal, not shown, and to the drain of an N-type MOS transistor 58 having its source connected to ground 19. The gate of transistor 58 receives signal $S_2$. The current measurement and comparison unit comprises a current measurement circuit 60 which, in the present example of embodiment, comprises a pair of PNP-type bipolar transistors $T_1$, $T_2$ having their bases connected in common to the collector of transistor $T_1$. The emitter of transistor $T_1$ is connected via a resistor $R_e$ to the source of reference voltage 27 and the collector of transistor $T_1$ is connected via a resistor $R_{J0}$ to ground 19. The emitter of transistor $T_2$ is connected via a resistor $R_e$ to the collector of power transistor $T_{buf}$ and the collector of transistor $T_2$ is connected via a resistor $R_S$ to ground 19. The voltage across resistor $R_S$ is noted $V_S$. The current measurement unit comprises a sampling and comparison unit 65 which comprises a controllable switch 66 having a terminal connected to the collector of transistor T2 and having its other terminal connected to a node G. A capacitor 68 is provided between node G and ground 19. The voltage across capacitor 68 drives a hysteresis comparator 70 which provides signal $S_2$. Switch 66 is controlled by signal $S_1$ provided by synchronization pulse detection unit 54 which receives video signal $S_{VIDEO}$. Synchronization pulse detection unit 54 is an element conventionally used, especially by a receiver corresponding to a display screen, and will not be described any further in the present description.

The operation of the output stage according to the present example of embodiment will now be described. Voltage $V_S$ is representative of current $I_{col}$ received by the collector of transistor $T_{buf}$, itself substantially equal to the current $I_{buf}$ provided by the emitter of transistor $T_{buf}$. Current $I_{buf}$ is equal to the sum of current $I_c$ provided by source 50 to load 12 and of current $I_s$ absorbed by current generator 28. On each pulse of video signal $S_{VIDEO}$, pulse detection unit 54 provides a signal $S_1$ which turns on switch 66. Voltage $V_S$ is then applied across capacitor 68. Based on the comparison of voltage $V_S$ with threshold voltages, it is possible to determine whether the receiver connected to source 50 is an AC receiver or a DC receiver and to block or turn on transistor 58, which respectively activates or cancels current $I_s$ via transistor $T_s$.

Figure 7:
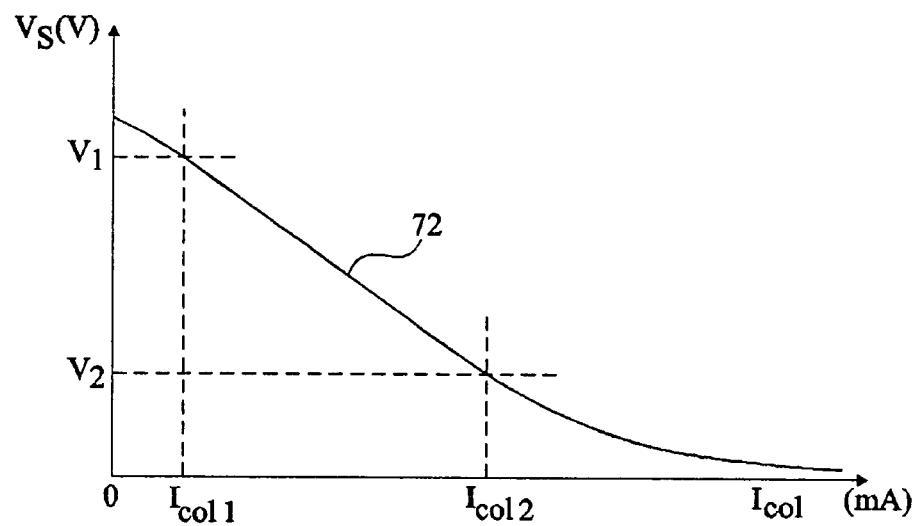
FIG. 7 shows the relation between a characteristic voltage and current used in the present invention.

FIG. 7 illustrates variation curve 72 of voltage $V_S$ according to current $I_{col}$. It should be noted that curve 72 comprises a substantially linear central portion having an extent defined by the values of resistors $R_e$, $R_s$, and $R_{J0}$.

An example of determination of the threshold voltages used by comparator 70 will now be described. When source 50 is connected to a DC receiver, theoretical value $I_{cth}$ of current $I_c$ provided to the DC receiver is determined, assuming that current generator 28 is deactivated, from the value of the voltage provided by the source on occurrence of a pulse of signal $S_{VIDEO}$. As an example, on occurrence of a pulse of signal $S_{VIDEO}$, current $I_{cth}$ is on the order of 2 mA. When source 50 is connected to an AC receiver, theoretical value $I_{sth}$ of current $I_s$ to be provided by current generator 28 is defined by the negative minimum value that the voltage across the resistor of the receiver in series with the input capacitor of the receiver can reach. As an example, current $I_{sth}$ is on the order of 8 mA.

When current generator 28 is deactivated, that is, when MOS transistor 58 is on, if current $I_c$, that is, $I_{col}$, decreases below $I_{cth}$, this means that the receiver is not of DC type but of AC type. Current generator 28 being deactivated, the presence of an AC or DC receiver can thus be determined by comparing current $I_{col}$ with a minimum threshold $I_{col1}$, for example, of 1 mA. This amounts to comparing voltage $V_S$ with a threshold voltage $V_1$. If $V_S$ is greater than $V_1$, this means that source 50 is connected to an AC receiver. MOS transistor 58 is then off, which activates current generator 28. Current $I_s$ is then present.

When current generator 28 is activated, if current $I_{col}$ is greater than theoretical current $I_{sth}$ provided by current generator 28, this means that the receiver is not of AC type but of DC type. Current generator 28 being activated, the presence of an AC or DC receiver can thus be determined by comparing current $I_{col}$ with a maximum threshold $I_{col2}$, for example, on the order of 9 mA. This amounts to comparing voltage $V_S$ with a threshold voltage $V_2$. If $V_S$ is smaller than $V_2$, this means that source 50 is connected to a DC receiver. MOS transistor 58 is then turned on, which deactivates current generator 28. Current $I_s$ cancels.

Threshold voltages $V_1$ and $V_2$ are determined from curve 72 of FIG. 7. As an example, with $I_{col1}$ equal to 1 mA and $I_{col2}$ equal to 9 mA, resistors $R_e$, $R_s$, and $R_{f0}$ may be selected so that threshold voltages $V_1$ and $V_2$ are respectively on the order of 4 V and 1.5 V with $R_{buf}$ on the order of some ten ohms.

Figure 8:
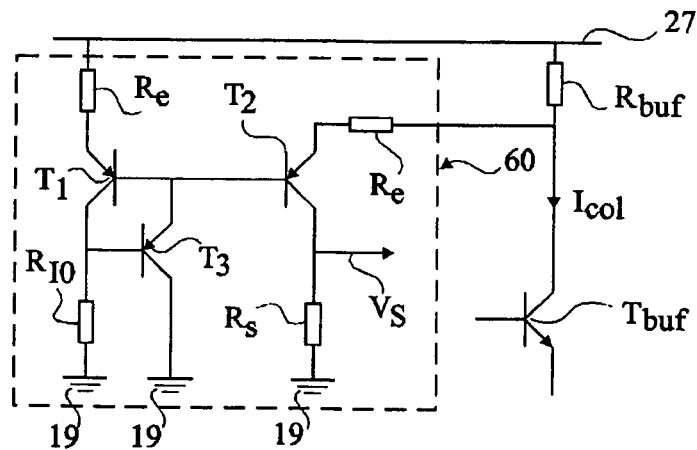
FIG. 8 shows a variation of an element of the source of FIG. 6.

FIG. 8 shows an alternative embodiment of current detection unit 60 in which an additional transistor $T_3$ having its base connected to the collector of transistor $T_1$, having its collector connected to ground 19, and having its emitter connected to the bases of transistors $T_1$ and $T_2$, is provided. Such a variation enables improving the temperature stability of variation curve 72 of voltage $V_s$ according to current $I_{col}$.

In certain applications, the output stage of the video signal source provides different video signals on different outputs. Such signals for example are Y/C-type signals (also called S-video signal) comprising a luminance signal (signal Y) and a chrominance signal (signal C). The source outputs may be connected to receivers of different natures. Thereby, a current measurement must be performed at the level of each output of the source.

Figure 9:
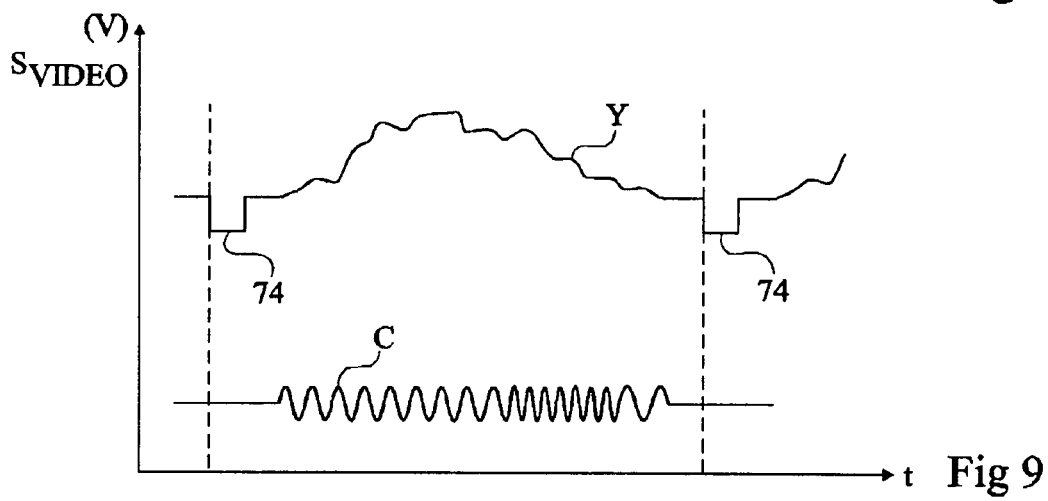
FIG. 9 shows a variation of video signals likely to be provided by a video signal source.

FIG. 9 shows an example of variation of signals Y and C. Generally, only luminance signal Y comprises synchronization pulses 74. Chrominance signal C comprises no synchronization pulses, but only stages of constant levels between two cycles.

Figure 10:
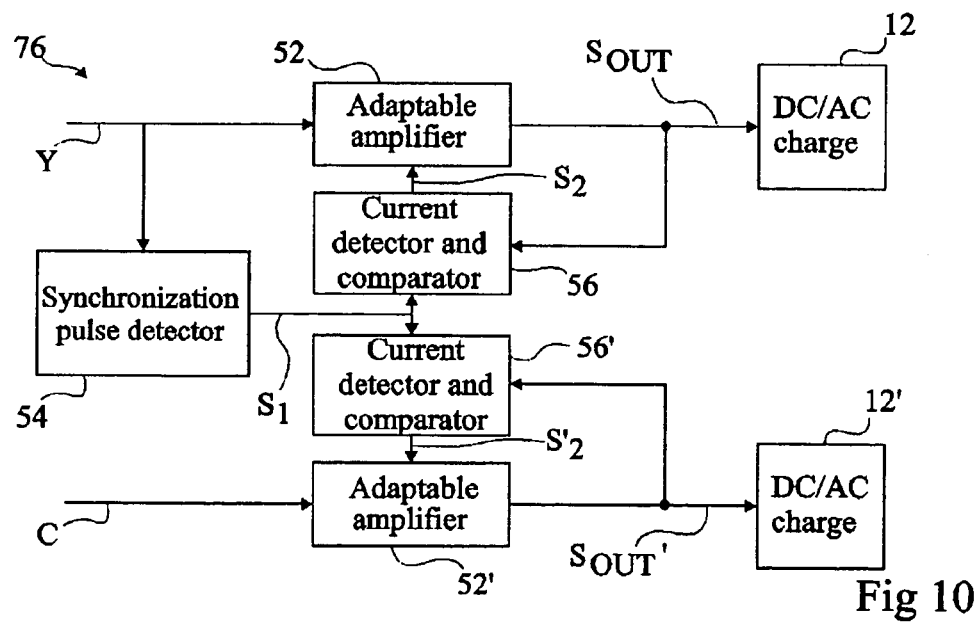
FIG. 10 shows an alternative embodiment of a video signal source according to the present invention.

FIG. 10 shows an example of embodiment of an output stage according to the present invention of a source 76 capable of providing two video signals $S_{OUT}$ and $S_{OUT'}$ to two receivers 12 and 12', possibly of different natures. As an example, signals $S_{OUT}$ and $S_{OUT'}$ are respectively provided from signals Y and C. The present invention provides for the circuits for providing $S_{OUT}$ and $S_{OUT'}$ to each comprise an adaptable amplifier 52, 52' receiving a control signal S2, S2' provided by a current measurement and comparison unit 56, 56', as described previously in relation with FIG. 5. Since signals Y and C are synchronous and only signal Y comprises synchronization pulses 74, the output stage of source 76 comprises a single synchronization detection unit 54 which provides the same control signal $S_1$ to current measurement and comparison units 56, 56'.

More generally, in the case of complex video signals formed of several signals, for example, YUV-type video signals (also called Y—Pr—Pb or Y-Cb-Cr signals), the present invention provides using a single synchronization pulse detection unit which controls each current measurement and comparison unit associated with each circuit for providing a component of the video signal.

Of course, the present invention is likely to have various alterations, modifications, and improvements which will readily occur to those skilled in the art. In particular, in the previously-described examples of embodiment, the source of reference voltage 27 corresponds to the positive power supply. However, such a source 27 may correspond to a negative power supply, the polarity of the bipolar transistors being then inverted.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. An electronic system providing a video signal to an output terminal intended to be connected to a receiver having one input impedance out of two input impedances, the electronic system comprising:

an adaptable amplifier providing the video signal and capable of operating according to one operation configuration out of two operation configurations, each operation configuration being adapted to one of the two input impedances of the receiver;

means for detecting characteristic portions of the video signal; and control and measurement means capable of measuring a signal representative of the current provided to the output terminal by the electronic system during each detected characteristic portion, and of having the adaptable amplifier adopt one of the two operation configurations based on the comparison of the representative measured signal with thresholds.

2. The electronic system of claim 1, wherein the adaptable amplifier provides the video signal in the form of a succession of cycles, each cycle starting with a pulse, said characteristic portions corresponding to said pulses.

3. The electronic system of claim 1, wherein the adaptable amplifier comprises a current generator connected to the output terminal, said control means being capable of deactivating the current generator when the sum of the current provided by the current generator and of the current provided to the output terminal is greater than a first current during one of the characteristic portions, and of activating the current generator when the current provided to the output terminal is smaller than a second current during one of the characteristic portions, the second current being smaller than the first current.

4. The electronic system of claim 1, providing a given number of output signals to said given number of output terminals, each connected to a receiver having one input impedance out of two input impedances, the electronic system comprising:

said given number of adaptable amplifiers, each providing one of said given number of video signals, each amplifier being capable of operating according to one operation configuration out of two operation configurations, each operation configuration being adapted to one of the two input impedances of the receiver;

means for detecting characteristic portions of a video signal out of said number of video signals; and said number of control means, each control means being capable of measuring a signal representative of the current provided by one of the amplifiers adaptable to the associated output terminal during each detected characteristic portion and of having said adaptable amplifier adopt one of the two operation configurations based on the comparison of the representative measured signal with thresholds.

5. The electronic system of claim 3, wherein the adaptable amplifier comprises a differential amplifier having a first input receiving an input video signal and having a second input connected to a node, said node being connected to a source of a reference voltage via a first resistor and to the output terminal via a second resistor, the output of the differential amplifier being connected to the control terminal of a first transistor having a first main terminal connected to the output terminal and having a second main terminal connected to a source of a first reference voltage via a third resistor, the current generator comprising a second transistor having a first main terminal connected to the output terminal and having a second main terminal connected to a source of a second reference voltage.

6. The electronic system of claim 5, wherein the current generator comprises a switch arranged between the control terminal of the second transistor and the source of the second reference voltage.

7. The electronic system of claim 6, wherein the control means comprises third and fourth transistors having their control terminals connected in common to a first main terminal of the third transistor, a second main terminal of the third transistor being connected to the source of the first reference voltage via a fourth resistor, the first main terminal of the third transistor being connected to the source of the second reference voltage via a fifth resistor, a first main terminal of the fourth transistor being connected to the second main terminal of the first transistor via a sixth resistor, a second main terminal of the fourth transistor being connected to the source of the second reference voltage via a seventh resistor, the representative signal being the voltage across the seventh resistor.

8. The electronic system of claim 7, wherein the control means comprise a hysteresis comparator receiving the representative measured signal and being capable of turning on the switch when the representative signal is greater than a first voltage and of turning off the switch when the representative signal is smaller than a second voltage smaller than the first voltage.

9. The electronic system of claim 8, wherein the control means comprise:
means for storing the representative signal connected to the hysteresis comparator; and
a switch controlled by the detection unit and arranged between the storage means and the second main terminal of the fourth transistor.

10. A method for adapting an electronic system providing a video signal to an output terminal intended to be connected to a receiver having one input impedance out of two input impedances, the method comprising the steps of:
providing an adaptable amplifier providing the video signal and capable of operating according to one operation configuration out of two operation configurations, each operation configuration being adapted to one of the two input impedances of the receiver;
detecting characteristic portions of the video signal;
measuring a signal representative of the current provided by the electronic system to the output terminal during each detected characteristic portion; and
having the adaptable amplifier adopt one of the two operation configurations based on the comparison of the representative measured signal with thresholds.

11. An electronic system to supply a video signal through an output terminal, comprising:
a controllable amplifier to supply the video signal, the controllable amplifier operable in a first operating mode or a second operating mode;
a detection circuit configured to detect a known portion of the video signal; and
a control circuit configured to measure a signal representative of a current provided to the output terminal during the detected portion of the video signal and to control the operating mode of the amplifier based on an evaluation of the measured signal.

12. An electronic system as defined in claim 11, wherein the control circuit is configured to evaluate the measured signal by comparison of the measured signal with a threshold.

13. An electronic system as defined in claim 11, wherein the detection circuit is configured to detect a pulse in each cycle of an input video signal.

14. An electronic system as defined in claim 11, wherein the controllable amplifier includes a current generator connected to the output terminal and wherein the control circuit is configured to deactivate the current generator when the sum of the current provided by the current generator and the current provided to the output terminal is greater than a first threshold current during the detected portion of the video signal and to activate the current generator when the current provided to the output terminal is less than a second threshold current during the detected portion of the video signal.

15. An electronic system as defined in claim 14, wherein the controllable amplifier further includes a differential amplifier having a first input receiving an input video signal and a second input connected to a node, the node connected to a first reference voltage through a first resistor and connected to the output terminal through a second resistor, an output of the differential amplifier connected to a control terminal of a first transistor having a first main terminal connected to the output terminal and having a second main terminal connected to a second reference voltage through a third resistor, the current generator comprising a second transistor having a first main terminal connected to the output terminal and having a second main terminal connected to a third reference voltage.

16. An electronic system as defined in claim 15, wherein the current generator further includes a switch connected between a control terminal of the second transistor and the third reference voltage.

17. An electronic system as defined in claim 16, wherein the control circuit includes third and fourth transistors having their control terminals connected to a first main terminal of the third transistor, a second main terminal of the third transistor being connected to the second reference voltage through a fourth resistor, the first main terminal of the third transistor being connected to the third reference voltage through a fifth resistor, a first main terminal of the fourth transistor being connected to the second main terminal of the first transistor through a sixth resistor, a second main terminal of the fourth transistor being connected to the third reference voltage through a seventh resistor, wherein the measured signal is a voltage across the seventh resistor.

18. An electronic system as defined in claim 17, wherein the control circuit further includes a comparator configured to receive the measured signal and to turn on the switch when the measured signal is greater than a first voltage and to turn off the switch when the measured signal is less than a second voltage smaller than the first voltage.

19. An electronic system as defined in claim 18, wherein the control circuit further includes a capacitor to store the measured signal and a switch controlled by the detection circuit and connected between the capacitor and the second main terminal of the fourth transistor.

20. An electronic system as defined in claim 11, comprising:
two or more controllable amplifiers, each providing a video signal through an output terminal and each operable in a first operating mode or a second operating mode;
the detection circuit being configured to detect a known portion of one of the video signals; and
a control circuit corresponding to each of the controllable amplifiers and configured to measure a signal representative of a current provided to the corresponding output terminal during the detected portion of the video signal and to control the operating mode of the corresponding amplifier based on an evaluation of the corresponding measured signal.

21. A method for controlling an operating mode of an electronic system that supplies a video signal through an output terminal, comprising:
providing a controllable amplifier that supplies the video signal and is operable in a first operating mode or a second operating mode;
detecting a known portion of the video signal;

measuring a signal representative of a current provided to the output terminal during the detected portion of the video signal; and controlling the operating mode of the amplifier based on an evaluation of the measured signal.

22. A method as defined in claim 21, wherein controlling the operating mode of the amplifier comprises comparing the measured signal with a threshold and selecting the operating mode based on a result of the comparison.

23. A method as defined in claim 21, wherein detecting the known portion of the video signal comprises detecting a synchronization pulse in the video signal.

24. A method as defined in claim 21, wherein the controllable amplifier includes a current generator connected to the output terminal and wherein controlling the operating mode of the amplifier comprises deactivating the current generator when the sum of the current provided by the current generator and the current provided to the output terminal is greater than a first current during the detected portion of the video signal and activating the current generator when the current provided to the output terminal is less than a second current during the detected portion of the video signal.

* * * * *